(12) United States Patent
Wang et al.

(10) Patent No.: US 7,012,882 B2
(45) Date of Patent: Mar. 14, 2006

(54) CHANNEL ESTIMATOR FOR OFDM SYSTEM

(75) Inventors: Zhaocheng Wang, Stuttgart (DE); Richard Stirling-Gallacher, Stuttgart (DE); Thomas Dölle, Haar (DE)

(73) Assignee: Sony International (Europe) GmbH, Berlin (DE)

( * ) Notice: Subject to any disclaimer, the term of this patent is extended or adjusted under 35 U.S.C. 154(b) by 928 days.

(21) Appl. No.: 09/919,040

(22) Filed: Jul. 30, 2001

(65) Prior Publication Data

US 2002/0034213 A1    Mar. 21, 2002

(30) Foreign Application Priority Data

Aug. 1, 2000   (EP) .................................. 00116635

(51) Int. Cl.
*H04J 11/00* (2006.01)
(52) U.S. Cl. ..................... 370/208; 370/203; 370/206
(58) Field of Classification Search .............. 370/203, 370/206, 343, 480, 491; 375/147
See application file for complete search history.

(56) References Cited

U.S. PATENT DOCUMENTS

| | | | | |
|---|---|---|---|---|
| 5,519,730 A | * | 5/1996 | Jasper et al. | 375/260 |
| 5,828,650 A | * | 10/1998 | Malkamaki et al. | 370/203 |
| 5,867,478 A | * | 2/1999 | Baum et al. | 370/203 |
| 6,240,146 B1 | * | 5/2001 | Stott et al. | 375/344 |
| 6,310,926 B1 | * | 10/2001 | Tore | 375/355 |
| 6,370,131 B1 | * | 4/2002 | Miya | 370/335 |
| 6,424,678 B1 | * | 7/2002 | Doberstein et al. | 375/260 |
| 6,470,030 B1 | * | 10/2002 | Park et al. | 370/480 |
| 6,545,997 B1 | * | 4/2003 | Bohnke et al. | 370/347 |
| 6,549,753 B1 | * | 4/2003 | Rinne | 455/3.02 |
| 6,807,147 B1 | * | 10/2004 | Heinonen et al. | 370/208 |
| 2002/0065047 A1 | * | 5/2002 | Moose | 455/63 |
| 2002/0176483 A1 | * | 11/2002 | Crawford | 375/137 |

FOREIGN PATENT DOCUMENTS

| | | |
|---|---|---|
| EP | 0 877 526 | 11/1998 |
| WO | WO 98 19410 | 5/1998 |

* cited by examiner

*Primary Examiner*—Ajit Patel
*Assistant Examiner*—Steven A Blount
(74) *Attorney, Agent, or Firm*—Oblon, Spivak, McClelland, Maier & Neustadt, P.C.

(57) ABSTRACT

The present invention relates to a device (10) for receiving signals in a wireless orthogonal frequency division multiplex (OFDM) system and to a channel estimation method in such a system. The data symbols and pilot symbols are transmitted in frequency subcarriers and timeslots, whereby pilot symbols are transmitted in a continuous stream within at least one frequency subcarrier. A channel estimation for a data symbol is performed on the basis of received pilot symbols using a filter including a common phase error correction value from the continuous stream pilot symbol in the same timeslot as the data symbol to be channel estimated.

The present invention thereby enables a correct and efficient channel estimation including a common phase error correction to be performed.

4 Claims, 2 Drawing Sheets

CHANNEL ESTIMATOR FOR OFDM SYSTEM

The present invention relates to the channel estimation in a wireless orthogonal frequency division multiplex (OFDM) system. Particularly, the present invention relates to a device for receiving signals in a wireless OFDM system and to a channel estimation method in a wireless OFDM system.

Wireless OFDM communication systems are systems, in which communication devices, as e.g. base stations, communicate with other devices, as e.g. mobile terminals, over a wireless communication link. In an OFDM system, the entire frequency bandwidth used for the transmission of signals is subdivided into a plurality of frequency subcarriers. Adjacent frequency subcarriers are respectively orthogonal to each other. Thus, very high data rate communication can be achieved in OFDM systems.

A transmission channel of an OFDM system can be characterised by a specific frequency subcarrier and a specific timeslot. A piece of information, such as a data symbol, to be transmitted in that specific transmission channel is mapped onto the frequency subcarrier in the specific timeslot. The data transmission in an OFDM system can therefore be represented by a time/frequency grid. In the frequency domain, adjacent transmission channels have respectively orthogonal frequency subcarriers.

Figure 2:
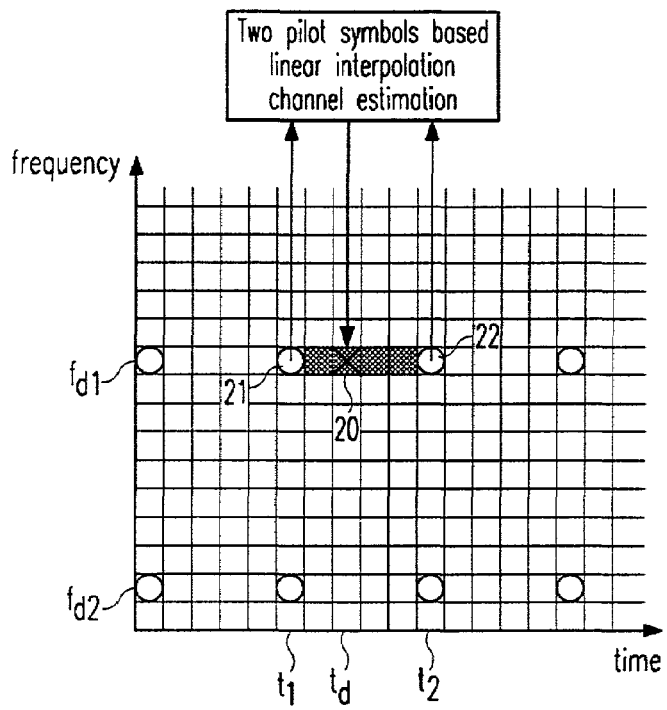

On the receiving side of an OFDM communication link, as e.g. a mobile terminal receiving signals from a base station, a channel estimation is performed for each transmission channel or data symbol in order to optimise the demodulation in the receiver in view of the estimated channel quality. Hereby, a specific pilot symbol pattern is transmitted in the time/frequency grid of the OFDM communication link. The time/frequency location (frequency subcarrier and timeslot) of the pilot symbols as well as the pilot symbol itself are known to the receiver, so that the receiver is able to perform a channel estimation for data symbols transmitted in transmission channels different from the pilot symbols. A typical pilot symbol pattern with a plurality of pilot symbols placed in the frequency subcarrier/ time grid of an OFDM system is shown in FIG. 2. The frequency domain is subdivided into a plurality of frequency subcarriers and the time domain is subdivided into a plurality of timeslots. Each frequency subcarrier and each timeslot define a transmission channel for the transmission of a data symbol or a pilot symbol. Pilot symbols are indicated by circles. In the example shown in FIG. 2, pilot symbols are transmitted in the frequency subcarrier $f_{d1}$ and in the frequency subcarrier $f_{d2}$ in respectively equidistant timepoints. For example, in the timeslots $t_1$ $_{and\ t2}$, pilot symbols are transmitted on both frequency subcarriers $f_{d1}$ and $f_{d2}$.

In the following, the principle of a standard channel estimation method in an OFDM communication system is described. An OFDM signal received in a receiving device of the OFDM system after a fast Fourier transformation for a frequency subcarrier x and a timeslot i can be represented by $$r_{x,i} = s_{x,i} \times h_{x,i} + n_{x,i}$$

whereby $s_{x,i}$ is the transmitted data symbol, $h_{x,i}$ is the complex channel response and $n_{x,i}$ is the adaptive White Gaussian noise for the frequency subcarrier x and the timeslot i.

For almost all channel estimation schemes, the first step is to use the knowledge of the transmitted pilot symbols and the received signals to perform a channel estimation at the frequency subcarrier/timeslot location of the pilot symbol. Assuming that the pilot symbols are located at the frequency carrier position x' and the timeslot position i', an initial channel estimation can be formed by $$\hat{h}_{x,i} = \frac{r_{x',i'}}{s_{x',i'}}$$

In order to obtain the channel estimation values for the frequency subcarriers and the times lots located between the pilot symbols (in frequency and/or in time dimension), a filter is usually used. This filter can have several general forms, which include a one-dimensional form (in frequency or time), a two-dimensional form (in frequency and time), a two-one-dimensional form (first frequency and then time or vice versa) and the like. Further, the filter itself can have fixed or variable coefficients. A very simple example of an one-dimensional time filter based e.g. on a linear interpolation scheme is explained in FIG. 2. In this case, the channel estimation for the transmission channel 20, which is characterised by the frequency subcarrier $f_{d1}$ and the timeslot $t_d$, is performed on the basis of the two pilot symbols 21 and 22 in the frequency subcarrier $f_{d1}$ and timepoints $t_1$ and $t_2$, respectively. Therefore, transmission channel 20 to be estimated is transmitted on the same frequency subcarrier $f_{d1}$ as the pilot symbols 21, 22, so that only a one-dimensional time filter is necessary. Thus, the channel estimation for the transmission channel 20 can e.g. very simply be performed on the basis of a linear interpolation of the channel transmission properties of the received pilot symbols 21 and 22.

However, all channel estimation algorithms proposed and used for OFDM communication systems as described above, do not take into account the effect of phase noise on the result of the channel estimation using received pilot symbols. The phase noise stems from the local oscillator in the receiver, which is a random pertubation of the phase of the steady sinusoidal waveform. There are two different kinds of phase noise. The first kind rotates the received signals by an amount, which is the same for all frequency subcarriers within one OFDM symbol (within one timeslot), but varies randomly from symbol to symbol, i.e. from timeslot to timeslot. This first kind of phase noise is called common phase error (CPE) and primarily results from the lower frequency components of the phase noise spectrum of the local oscillator. The second kind of phase noise is called intercarrier interference (ICI) which works like additive thermal noise and primarily results from the higher frequency components of the phase noise spectrum of the local oscillator. The CPE component caused by the phase noise is eliminated in known receiving devices by inserting a complex CPE correction module in an OFDM demodulator. Alternatively, the effect of the phase noise can be reduced by adapting a stable but expensive local oscillator. However, using a complex CPE correction module as an additional element or a stable and expensive local oscillator raises the entire costs and the constructional complexity.

The object of the present invention is therefore to provide a device for receiving signals in a wireless OFDM system and a channel estimation method in a wireless OFDM system, which allow the implementation of a simple but effective channel estimation algorithm with a simple construction.

The above object is achieved by a device for receiving signals in a wireless OFDM system according to claim 1, in which data symbols and pilot symbols are transmitted in frequency subcarriers and timeslots. The device according to the present invention comprises receiving means for receiving pilot symbols transmitted in a continuous stream within at least one frequency subcarrier and channel estimation means for performing a channel estimation for a data symbol on the basis of received pilot symbols using a filter including a common phase error correction value from the continuous stream pilot symbol in the same timeslot as the data symbol to be channel estimated.

Further, the above object is achieved by a channel estimation method in a wireless OFDM system according to claim 6, in which data symbols and pilot symbols are transmitted in frequency subcarriers and timeslots and in which pilot symbols are transmitted in a continuous stream within at least one frequency subcarrier, whereby a channel estimation for a data symbol is performed on the basis of received pilot symbols using a filter including a common phase error correction value from the continuous stream pilot symbol in the same timeslot as the data symbol to be channel estimated.

Thus, the present invention proposes a channel estimation on the basis of received pilot symbols using a filter including a common phase error correction value. The filter can be any kind of filter. The common phase error correction value is obtained on the basis of the continuous stream pilot symbol in the same timeslot as the data symbol to be channel estimated. Thus, the wireless OFDM communication system of the present invention necessarily requires at least one continuous stream of pilot symbols in one of the plurality of frequency subcarriers. Some OFDM systems used in wireless communication or telecommunication scenarios have a high number of frequency subcarriers, so that using at least one entire frequency subcarrier for the transmission of a continuous stream of pilot symbols does not effect the data transmission capacity too much. It has to be noted that the term continuous stream of pilot symbols means that each of the consecutive symbols or timeslots of a respective frequency subcarrier carries a pilot symbol, so that a continuous stream of respectively succeeding pilot symbols is transmitted in that frequency subcarrier. Further, the common phase error is the same for all frequency subcarriers within one symbol or timeslot, so that using a phase error correction value from the pilot symbol of the continuous stream in the same timeslot as the data symbol to be channel estimated ensures that the phase error can be sufficiently reduced or even eliminated. Further, the present invention allows the integration of the common phase error correction into the channel estimation algorithm so that the overall processing complexity is reduced.

Advantageous features are claimed in the respective subclaims.

Advantageously, the receiving means is further adapted to receive distributed or scattered pilot symbols distributed or scattered among said frequency subcarriers and timeslots, whereby said channel estimation means performs said channel estimation on the basis of at least two of said distributed pilot symbols. In other words, besides the continuous stream of pilot symbols in at least one frequency subcarrier, further distributed pilot symbols are used. These distributed pilot symbols do not need to be in adjacent transmission channels and can have a regular or an irregular pattern, as long as the pattern is known to the receiving device performing the channel estimation. Additionally using pilot symbols from the pattern of distributed pilot symbols makes the channel estimation on the receiving side more accurate and reliable and therefore further increases the receiving quality. Hereby, the channel estimation means may perform the channel estimation on the basis of at least two of said distributed pilot symbols in different timeslots using a time filter. Thus, a time filter on the basis of at least two pilot symbols having different timeslots is used together with the common phase error correction value from the continuous stream pilot symbol of the same timeslot as the data symbol to be channel estimated. Hereby, a very accurate and efficient channel estimation can be performed.

The channel estimation means advantageously calculates the common phase error correction value on the basis of the continuous stream pilot symbol in the same timeslot as the data symbol to be channel estimated and on the basis of the continuous stream pilot symbols respectively in the same timeslots as said at least two distributed pilot symbols. The at least two distributed pilot symbols are located in different timeslots so that a respective continuous stream pilot symbol can be found in the respective same timeslots. Then, the common phase error correction value is calculated on the basis of the continuous stream pilot symbol in the same timeslot as the data symbol to be channel estimated and on the basis of the at least two continuous stream pilot symbols in the same timeslots as the distributed pilot symbols. In this case, the common phase error correction value is advantageously calculated on the basis of common phase error ratios between said continuous stream pilot symbol in the same timeslot as the data symbol to be channel estimated and each of said continuous stream pilot symbols respectively in the same timeslot as said at least two distributed pilot symbols. Hereby, the common phase error ratios are implemented in the algorithm for calculating the channel estimation for the respective data symbol so that a simple and effective implementation of the entire channel estimation algorithm including a common phase error suppression is enabled.

Figure 1:
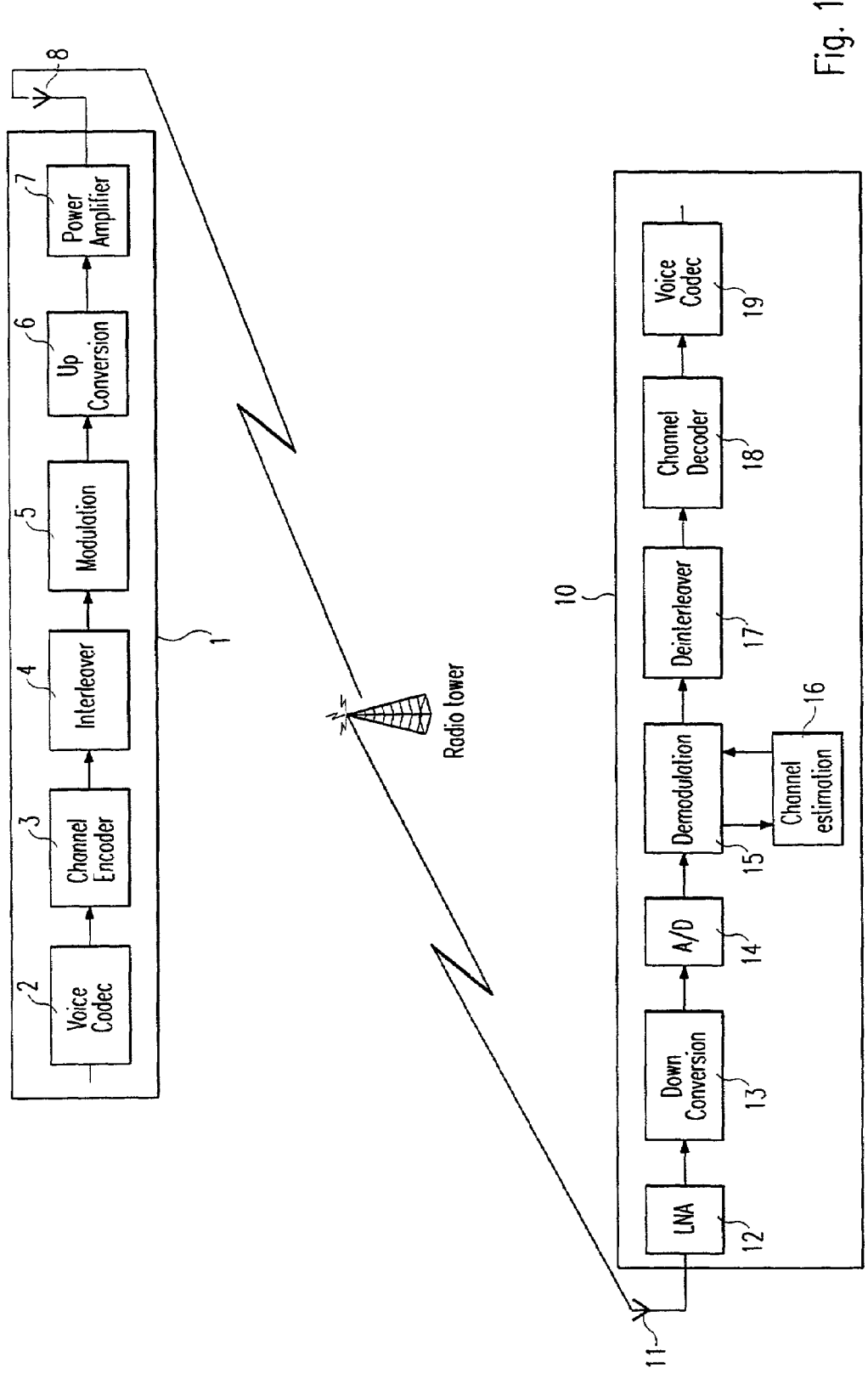
Figure 3:
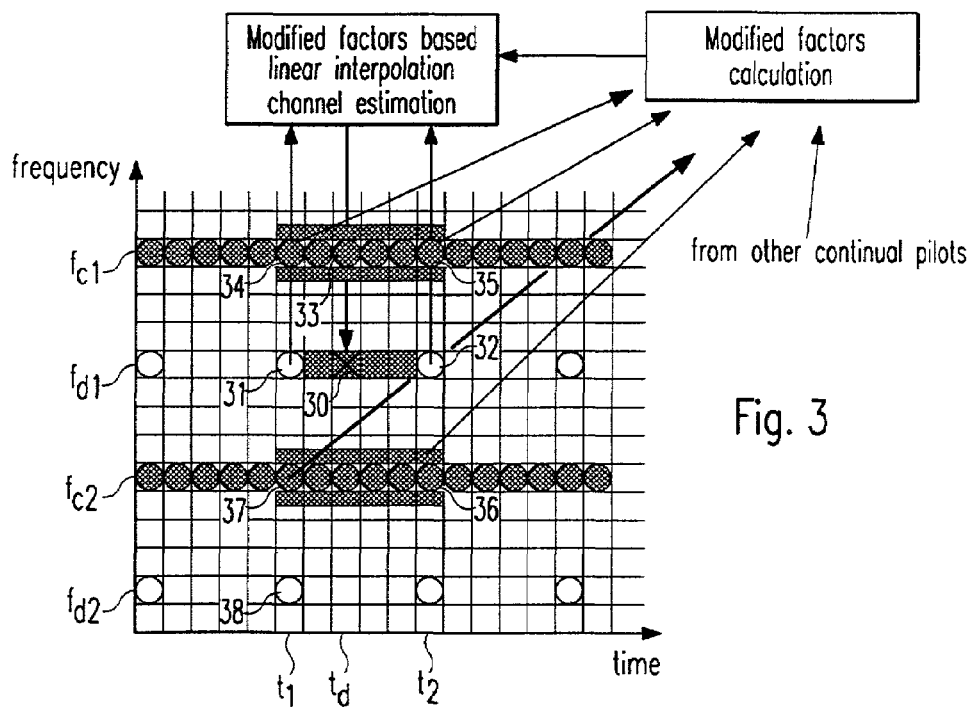

The present invention is explained in more detail in the following description in relation to the enclosed drawings, in which FIG. 1 shows a wireless OFDM communication system including a transmitting device and a receiving device, FIG. 2 shows a subcarrier frequency and timeslot grid of a wireless OFDM communication system with a known pilot symbol pattern, and FIG. 3 shows an example of a subcarrier frequency and timeslot grid of an OFDM communication system according to the present invention having at least one continuous stream of pilot symbols within one frequency subcarrier.

A wireless communication system comprising a transmitting device 1, such as a base station, and a receiving device 10, such as a mobile terminal, are shown in FIG. 1. The wireless communication system is an OFDM system, in which data symbols are transmitted in frequency subcarriers and timeslots. The entire frequency range is subdivided into a plurality of frequency subcarriers. The transmitting device 1 comprises all necessary and known elements for the operation in a wireless OFDM communication system, such as a voice codec 2, a channel encoder 3, an interleaver 4, a modulation means 5, an upconversion means 6, a power amplifier 7 and an antenna 8. In case that the transmitting device 1 is part of a base station or a mobile terminal of the OFDM system, it further comprises all necessary elements for receiving signals and for processing the received signals.

Signals transmitted via the antenna 8 of the transmitting device 1 are wirelessly transmitted to a receiving device 10 of the wireless OFDM communication system, optionally with the support of an intermediate amplifying radio tower as shown. The receiving device 10 of the wireless OFDM communication system is a receiving device according to the present invention and comprises all necessary elements for the operation in the wireless OFDM communication system, such as an antenna 11, a low-noise amplifier 12, a down-conversion means 13, an A/D-converter 14, a demodulation means 15, a channel estimation means 16, a deinterleaver 17, a channel decoder 18 and a voice codec 19. In case that the receiving device 10 is part of a mobile terminal of the wireless OFDM communication system, it further comprises all necessary elements for transmitting signals and processing to be transmitted signals in the communication system.

The channel estimation means 16 performs the channel estimation for the transmission channels or data symbols received from the transmitting device 1 and supplies the correspondingly calculated channel estimation values to the demodulation means 15, which correspondingly demodulates the received data symbols so that a good receiving quality is ensured.

As stated in the introduction, the channel estimation in OFDM systems using coherent modulation as in the present case, the channel estimation is performed on the basis of filters or algorithms operating in the frequency and/or the time domain. The channel estimation means 16 of the receiving device 10 according to the present invention also performs a channel estimation on the basis of a filter. However, the used filter includes a common phase error correction value to reduce the common phase error stemming from the local oscillator (not shown) used in the receiving device 10. In order to provide a common phase error correction value which can be included into the filtering and thus into the channel estimation of a data symbol, a pilot symbol pattern is necessary, in which at least one frequency subcarrier a continuous stream of pilot symbols is transmitted and received by the receiving device 10 according to the present invention. A continuous stream of pilot symbols means here that each timeslot or symbol of at least one frequency subcarrier carries a pilot symbol, as e.g. the subcarriers $f_{c1}$ and $f_{c2}$ shown in the frequency subcarrier and timeslot grid of a wireless OFDM system according to the present invention shown as an example in FIG. 3.

According to the present invention, a common phase error correction value from the continuous stream pilot symbol in the same timeslot as the data symbol to be channel estimated is used in the filter for the channel estimation. If, e.g. the data symbol 30 of the frequency/time grid shown in FIG. 3 is to be channel estimated in the receiving device 10 shown in FIG. 1, a common phase error correction value from the pilot symbol 33 which has the same timeslot $t_d$ as the data symbol 30 is used in the filter for the channel estimation. The general construction of the filter can be of any type.

However, better channel estimation can be performed if the filter is applied in more than one dimension (time and/or frequency). An example is shown in and explained in relation to FIG. 3. Here, the time/frequency grid shows two frequency subcarriers $f_{c1}$ and $f_{c2}$ having a continuous stream of pilot symbols transmitted therein. Further, distributed pilot symbols are transmitted in distributed transmission channels between the frequency subcarriers with the continuous stream of pilot symbols. In the shown example, distributed pilot symbols are transmitted in the frequency subcarriers $f_{d1}$ and $f_{d2}$ in an equidistant fashion and at the same timepoints. For example, the pilot symbol 31 is transmitted in the frequency subcarrier $f_{d1}$ in the same timeslot $t_1$ as the pilot symbol 38 in the frequency subcarrier $f_{d2}$. Hereby, if the transmission channel of the data symbol 30 is to be channel estimated, a one-dimensional filter in the time domain on the basis of the pilot symbols 31 and 32 transmitted in the same frequency subcarrier $f_{d1}$ can be used as a filter for the channel estimation. Hereby, the common phase error correction value from the pilot symbol 33 can be included in the one-dimensional time filter. The pilot symbol 33 has the same timeslot $t_d$ as the data symbol 30 to be channel estimated and therefore a similar or even the same phase error.

In the following, an example of a channel estimation according to the present invention using a time domain filtering is explained. A convention channel estimation algorithm using exclusively time domain filtering (without common phase error correction) yields the channel estimation $\hat{h}_{x,i}$ at the data symbol locations (frequency subcarrier x and timeslot i):

$$\hat{h}_{x,i} \times w_i^T h'_x$$

whereby $w^T_x$ is a transpose of the filter column vector for the timeslot i and $h'_i$ is a column vector which contains a subset of size N of the initial estimates at the pilot symbol locations $\hat{h}_{x',i'}$, N being an integer number. In the present case, which is explained as an example, a time domain filtering is performed by using two pilot symbols 31, 32, spaced in time (N=2) and whereby the pilot symbols are separated by Y timeslots. Further, the wanted channel estimation is located at the timeslot i which is v timeslots from the first pilot symbol. For simple linear interpolation, this gives $$W_i = (1-v/Y, v/Y), \text{ and}$$

$$h'_x = (C_1 \times P_1, C_2 \times P_2)$$

whereby $C_1$ and $C_2$ are the real channel transfer functions for the two pilot symbols 31 and 32 and $P_1$ and $P_2$ are their respective common phase errors caused by the phase noise of the local oscillator. For a coherent detection as necessary for the coherent demodulation, $C_d \times P_d$ is required, whereby $C_d$ is the real channel transfer function and $P_d$ is the common phase error caused by the phase noise of the data symbol to be channel estimated. Since the common phase error is the same for all frequency subcarriers within any one OFDM symbol or timeslot, but varies randomly from symbol to symbol, $P_1 \neq P_d \neq P_2$ is valid. Assuming that the channel transfer function stays constant between the two consecutive pilot symbols 31 and 32, $C_1 = C_d = C_2$ is valid. This gives for the channel estimation:

$$\hat{h}_{x,i} = C_d \times [(1-v/Y) \times P_1 + v/Y \times P_2]$$

It can be seen that $\hat{h}_{x,i}$ is not equal to $C_d \times P_d$. Therefore, with a non-negligible common phase error, the conventional linear interpolation algorithm does not work for coherent OFDM systems. According to the present invention, the effects of the phase noise are compensated by using a common phase error correction value in the filter algorithm. For example, a modified diagonal matrix R can be used in the channel estimation algorithm in order to compensate for the effects of the phase noise:

$$\hat{h}_{x,i} = w_i^T R h'_x$$

The diagonal elements of the diagonal matrix R contain the modification factors or common phase error correction values. For example, in case that N=2, $$R = \begin{bmatrix} R_1, 0 \\ 0, R_2 \end{bmatrix}$$

In relation to the example shown in FIG. 3, the pilot symbols 31 and 32 are used for the time filter but a common phase error correction value from the pilot symbol 33 of the continuous scheme of pilot symbols of the frequency subcarrier $f_{c1}$ is included. The pilot symbol 33 has the same timeslot $t_d$ as the data symbol to be channel estimated. In relation to the above given equations, $R_1$ can then be the common phase error ratio between the pilot symbol 34 having the same timeslot $d_1$, as the first distributed pilot symbol 31. $R_2$ can be the common phase error ratio between the pilot symbol 33 and the pilot symbol 35 having the same timeslot $t_2$ as the second distributed pilot symbol 32. Both pilot symbols 34 and 35 are also part of the continuous stream of pilot symbols of the frequency subcarrier $f_{c1}$. In this way, a common phase error correction can be included in a simple and effective way into the channel estimation algorithm. Using the diagonal matrix R, the channel estimation can be given by $$\hat{h}_{x,i} = (1-v/Y) \times C_1 \times P_1 \times R_1 + v/Y \times C_2 \times P_2 \times R_2$$

In the example given above, $R_1$ is given as $$R_1 = \frac{P_d}{P_1},$$

and $R_2$ is given as $$R_2 = \frac{P_d}{P_2}.$$

Assuming that the channel transfer function stays constant, i.e. $C_1 = C_d = C_2$, between these consecutive pilot symbols 34 and 35, this equation can be modified to:

$$\hat{h}_{x,i} = (1 - v/Y) \times C_1 \times P_1 \times \frac{P_d}{P_1} + v \bigg/ Y \times C_2 \times P_2 \times \frac{P_d}{P_2} = T_d \times P_d$$

and therefore a reliable and correct channel estimation for coherent OFDM systems is achieved.

In case that a second or more frequency subcarriers are provided having a continuous stream of pilot symbols, as e.g. frequency subcarrier $f_{c2}$ of the example shown in FIG. 3, further continuous stream pilot symbols can be used for the calculation of the common phase error correction value for the data symbol 30 to be channel estimated. For example, the pilot symbols 36 and 37 of the frequency subcarrier $f_{c2}$ in the same timeslots as the pilot symbols 34 and 35 of the frequency subcarrier $f_{c1}$ could be used and integrated in the matrix R. Hereby, a very accurate common phase error correction within the channel estimation algorithm is possible.

The invention claimed is:

1. Device (10) for receiving signals in a wireless orthogonal frequency division multiplex (OFDM) system, in which data symbols and pilot symbols are transmitted in frequency subcarriers and timeslots, comprising receiving means (11) for receiving pilot symbols transmitted in a continuous stream within at least one frequency subcarrier and receiving distributed pilot symbols distributed among said frequency subcarriers and timeslots;

channel estimation means (16) for performing a channel estimation for a data symbol on the basis of received pilot symbols using a filter including a common phase error correction value from the continuous stream pilot symbol in the same timeslot as the data symbol to be channel estimated; said channel estimation means performing said channel estimation on the basis of at least two of said distributed pilot symbols in different timeslots using a time filter; said channel estimation means calculating said common phase error correction value on the basis of the continuous stream pilot symbol in the same timeslot as the data symbol to be channel estimated and on the basis of the continuous stream pilot symbols respectively in the same timeslot as said at least two distributed pilot symbols.

2. Device (10) according to claim 1, characterized in, that said common phase error correction value is calculated on the basis of common phase error ratios between said continuous stream pilot symbol in the same timeslot as the data symbol to be channel estimated and each of said continuous stream pilot symbols respectively in the same timeslot as said at least two distributed pilot symbols.

3. Channel estimation method in a wireless orthogonal frequency division multiplex (OFDM) system, in which data symbols and pilot symbols are transmitted in frequency subcarriers and timeslots and in which pilot symbols are transmitted in a continuous stream within at least one frequency subcarrier, whereby a channel estimation for a data symbol is performed on the basis of received pilot symbols using a filter including a common phase error correction value from the continuous stream pilot symbol in the same timeslot as the data symbol to be channel estimated;

wherein distributed pilot symbols are distributed among said frequency subcarriers and timeslots, whereby said channel estimation is performed on the basis of at least two of said distributed pilot symbols in different timeslots using a time filter; and wherein said common phase error correction value is calculated on the basis of the continuous stream pilot symbol in the same timeslot as the data symbol to be channel estimated and on the basis of the continuous stream pilot symbols respectively in the same timeslot as said at least two distributed pilot symbols.

4. Channel estimation method according to claim 3, characterized in, that said common phase error correction value is calculated on the basis of common phase error ratios between said continuous stream pilot symbol in the same timeslot as the data symbol to be channel estimated and each of said continuous stream pilot symbols respectively in the same timeslot as said at least two distributed pilot symbols.

* * * * *